United States Patent
Yang et al.

(10) Patent No.: US 12,213,163 B2
(45) Date of Patent: Jan. 28, 2025

(54) ENHANCEMENT TO INTERFERENCE CANCELLATION

(71) Applicant: QUALCOMM Incorporated, San Diego, CA (US)

(72) Inventors: Ming Yang, San Diego, CA (US); Kausik Ray Chaudhuri, San Diego, CA (US); Juan Montojo, San Diego, CA (US); Danlu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 353 days.

(21) Appl. No.: 17/591,537

(22) Filed: Feb. 2, 2022

(65) Prior Publication Data

US 2023/0247662 A1 Aug. 3, 2023

(51) Int. Cl.
*H04W 72/08* (2009.01)
*H04W 72/542* (2023.01)

(52) U.S. Cl.
CPC .................................. *H04W 72/542* (2023.01)

(58) Field of Classification Search
CPC ... H04W 72/542; H04W 36/20; H04W 52/24; H04W 52/241; H04W 52/243; H04W 52/244; H04W 72/541; H04W 72/543; H04W 72/56; H04W 72/563; H04W 72/566; H04W 72/00; H04W 76/40; H04W 4/06; H04W 36/0007; H04W 72/30; H04W 48/10; H04W 62/24; H04L 5/0048; H04L 5/0053; H04L 5/0073; H04L 5/00; H04L 5/0062; H04L 5/0066; H04L 12/18; H04L 12/1845; H04L 47/806; H04L 25/0328; H04J 11/005; H04J 11/00; H04J 11/0023; H04J 11/0033; H04J 11/0026;
(Continued)

(56) References Cited

U.S. PATENT DOCUMENTS 9,549,331 B2 * 1/2017 Kim et al. ............. H04W 24/08
9,838,894 B2 * 12/2017 Hwang et al. ........ H04W 24/08
(Continued)

FOREIGN PATENT DOCUMENTS

WO WO 2014014317 A1 * 1/2014 ............... H04B 7/26
WO WO 2014015504 A1 * 1/2014 ............ H04W 72/00
WO WO 2015044408 A1 * 4/2015 ............ H04W 72/12

OTHER PUBLICATIONS (WO 2017200119 A1) >>> Method by Which Terminal Applies Control Channel Interference Mitigation Technique, and Device (see title) (Year: 2017).*

(Continued)

*Primary Examiner* — Meless N Zewdu
(74) *Attorney, Agent, or Firm* — Seyfarth Shaw LLP

(57) ABSTRACT

A method of wireless communication by a user equipment (UE) includes receiving, from a serving cell, information to assist the UE with interference cancellation of at least one neighbor cell. The method also includes performing interference cancellation based on the information. A method of wireless communication by a network device includes obtaining information to enable interference cancellation of a neighbor cell. The method also includes transmitting the information to assist a user equipment (UE) with interference cancellation of the neighbor cell.

16 Claims, 6 Drawing Sheets

(58) Field of Classification Search
CPC .. H04J 11/004; H04J 11/0063; H04J 11/0066; H04B 1/082; H04B 1/10; H04B 1/1009; H04B 1/1018; H04B 1/1027; H04B 2001/1045; H04B 1/7097; H04B 1/71; H04B 1/7107; H04B 1/71072; H04B 1/71075; H04B 1/711; H04B 15/00; H04B 15/005; H04B 15/02; H04B 15/025; H04B 15/04; H04B 15/06; H04B 17/336; H04B 17/345; H04B 17/346; H04B 1/7103

See application file for complete search history.

(56) References Cited

U.S. PATENT DOCUMENTS

| | | | | |
|---|---|---|---|---|
| 10,530,555 | B2* | 1/2020 | Li | H04L 5/0073 |
| 11,044,693 | B1* | 6/2021 | Gummadi et al. | H04W 64/003 |
| 2010/0182903 | A1* | 7/2010 | Palanki et al. | 370/225 |
| 2012/0122472 | A1* | 5/2012 | Krishnamurthy et al. | 455/456.1 |
| 2014/0204866 | A1* | 7/2014 | Siomina et al. | H04L 5/0073 |
| 2014/0206341 | A1* | 7/2014 | Siomina et al. | H04W 24/02 |
| 2014/0293971 | A1* | 10/2014 | Yoo et al. | H04W 56/003 |
| 2014/0302863 | A1* | 10/2014 | Chen et al. | H04W 72/082 |
| 2015/0043369 | A1 | 2/2015 | Kim et al. | |
| 2015/0156785 | A1* | 6/2015 | Park et al. | H04W 72/082 |
| 2015/0358855 | A1* | 12/2015 | Yang et al. | H04W 28/048 |
| 2015/0358975 | A1 | 12/2015 | Yang et al. | |
| 2015/0372779 | A1* | 12/2015 | Lim et al. | H04J 11/005 |
| 2015/0373569 | A1* | 12/2015 | Hwang et al. | H04W 24/08 |
| 2016/0128022 | A1* | 5/2016 | Park et al. | H04W 72/05 |
| 2017/0041085 | A1* | 2/2017 | Kwon | H04B 15/00 |
| 2017/0048749 | A1* | 2/2017 | Kim et al. | H04W 28/048 |
| 2017/0215103 | A1 | 7/2017 | Liu et al. | |
| 2017/0244435 | A1* | 8/2017 | Yamada et al. | H04B 1/1027 |
| 2017/0310417 | A1* | 10/2017 | Jung et al. | H04J 15/00 |
| 2017/0317856 | A1* | 11/2017 | Lee et al. | H04L 25/03006 |
| 2018/0034601 | A1* | 2/2018 | Ellenbeck et al. | H04L 5/0007 |
| 2018/0049082 | A1* | 2/2018 | Kinthada Venkata et al. | H04W 36/04 |
| 2020/0092763 | A1* | 3/2020 | Yerramalli et al. | H04W 36/0061 |
| 2020/0214049 | A1* | 7/2020 | Deenoo et al. | H04W 74/0833 |
| 2021/0266753 | A1* | 8/2021 | Kumar | H04W 16/14 |
| 2022/0322372 | A1* | 10/2022 | Takeda et al. | H04W 72/1231 |

OTHER PUBLICATIONS (WO 2016024834 A1) >>> Method and Terminal for Removing Interference (see title) (Year: 2016).*

(KR 20150082213 A) >>> Interference Cancellation Receiving Method and Interference Cancellation Receiving Terminal (see title) (Year: 2015).*

(JP 2019033513 A) >>> Terminal Device, Base Station Device, Communication System, Reception Method, Transmission Method and Communication Method (see title) (Year: 2019).*

(CN 106464407 A) >>> Cancelling Interference And Received Signal Method And Device In Wireless Communication System (see title) (Year: 2017).*

(CN 106464408 A) >>> Cancelling Interference And Received Signal Method And Device In Wireless Communication System (see title) (Year: 2017).*

(VN 10028438 B) >>> Method and User Equipment for Receiving Signal Network-Assisted Interference Cancellation and Suppression in Wireless Communication System (see title) (Year: 2021).*

(WO 2013185659 A1) >>> Method and Device for Receiving System Information (see title) (Year: 2013).*

(CN 117016036 A) >>> Method And Apparatus For Controlling Uplink Transmission Power Of A Network Coordinated Communication System (see title) (Year: 2023).*

Shaheen et al. (MY 200402 A) >>> UE-EUTRA-Capability field descriptions FDD/TDD diff 5 naies-Capability-ListIndicates that UE supports NAICS, i.e. receiving assistance information from serving cell and using it to cancel or suppress interference (see p. 154) (Year: 2023).*

Zhu et al. (WO 2013185459 A1) >>> Method and Device for Receiving System Information (see title) (Year: 2013).*

Guan et al. (WO 2014110815 A1) >>> Detection Method, Transmission Method and Apparatus for Common Control Channel (see title) (Year: 2014).*

Hwang et al. (WO 2016089070 A2) >>> Method and User Equipment for Selecting Cell for Which to Perform Interference Cancellation (see title) (Year: 2016).*

(WO 2014123387 A1) >>> Method for Transmitting Support Information for Removing Interference of Terminal, and Serving Cell Base Station (see title) (Year: 2014).*

China Telecom: "WF on General Part and 15 kHz NR SCS Scenario for CRS-IM Receiver", 3GPP TSG-RAN WG4 Meeting # 101-bis-e, R4-2203131, 3rd Generation Partnership Project, Jan. 17-25, 2022, pp. 1-11.

International Search Report and Written Opinion—PCT/US2023/010433—ISA/EPO—Apr. 12, 2023.

* cited by examiner

ENHANCEMENT TO INTERFERENCE CANCELLATION

FIELD OF THE DISCLOSURE

The present disclosure relates generally to wireless communications, and more specifically to improving interference cancellation, for example, in a dynamic spectrum sharing (DSS) deployment.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In aspects of the present disclosure, a method of wireless communication by a user equipment (UE) includes receiving, from a serving cell, information to assist the UE with interference cancellation of at least one neighbor cell. The method also includes performing interference cancellation based on the information.

In other aspects of the present disclosure, a method of wireless communication by a network device includes obtaining information to enable interference cancellation of a neighbor cell. The method also includes transmitting the information to assist a user equipment (UE) with interference cancellation of the neighbor cell.

Other aspects of the present disclosure are directed to an apparatus for wireless communication by a user equipment (UE). The apparatus has a memory and one or more processor(s) coupled to the memory. The processor(s) is configured to receive, from a serving cell, information to assist the UE with interference cancellation of at least one neighbor cell. The processor is also configured to perform interference cancellation based on the information.

Other aspects of the present disclosure are directed to an apparatus for wireless communication by a network device. The apparatus has a memory and one or more processor(s) coupled to the memory. The processor(s) is configured to obtain information to enable interference cancellation of a neighbor cell. The processor(s) is also configured to transmit the information to assist a user equipment (UE) with interference cancellation of the neighbor cell.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
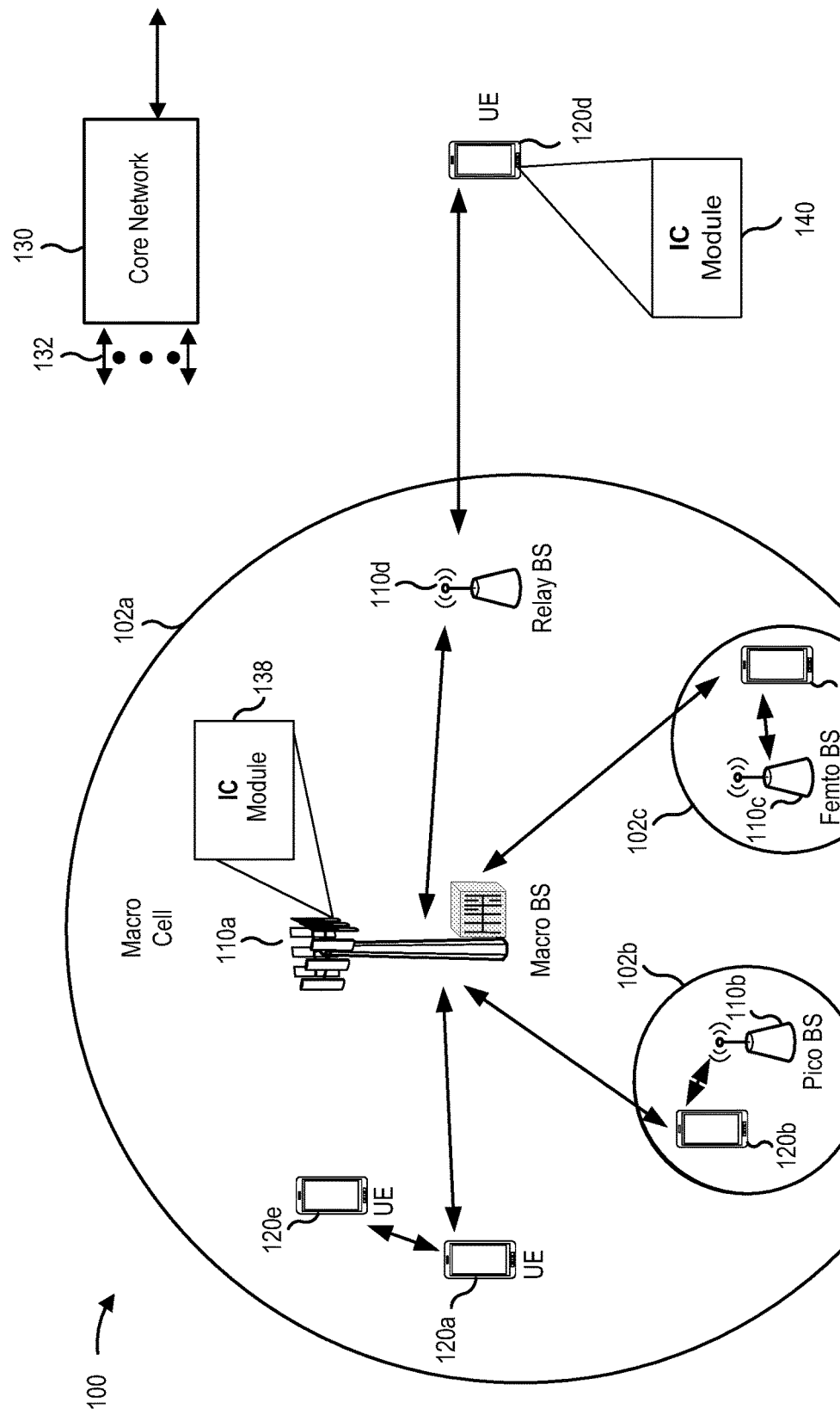
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

A 5G new radio (NR) standalone (SA) deployment may employ a low band frequency division duplex (FDD) spectrum in order to expand 5G coverage to achieve continuous NR coverage. This low band spectrum enables rapid coverage extension without requiring new sites. For many network operators, this low band frequency spectrum is already reserved for long term evolution (LTE) communications. Because a load of cells in these existing systems remains high, migrating the low band spectrum in a hotspot region to an NR wireless system is challenging. Dynamic spectrum sharing (DSS) helps with migration of spectrum from LTE to NR. With DSS, NR and LTE may share the same spectrum.

In a DSS deployment, signals within existing LTE systems may interfere with NR communications. For example, a cell specific reference signal (CRS) is transmitted in LTE systems during every downlink subframe across the entire downlink cell bandwidth. The CRS is a high density, always-on signal in the time and frequency domains. Moreover, the CRS may be power boosted.

The CRS may therefore interfere with 5G communications. CRS interference may be mitigated to improve spectral efficiency. In order to perform interference cancellation, knowledge of one or more characteristics of the neighbor cell transmissions may improve interference cancellation performance. For example, knowledge of the neighbor cell's CRS configuration may improve interference cancellation performance. This configuration information may be obtained by decoding a broadcast channel, such as a physical broadcast channel (PBCH), of the neighbor cell. If decoding of the neighbor cell's PBCH is unsuccessful, neighbor cell reference signal interference cancellation may be limited.

The PBCH carries information that helps with interference cancellation, such as a location of a reference signal or SIB. Without decoding the PBCH to learn this information, a user equipment (UE) may have difficulty in performing interference cancellation.

According to aspects of the present disclosure, a UE receives information to enable interference cancellation from sources other than from a decoded neighbor cell PBCH. For example, in response to a decoding failure of a neighbor LTE or DSS PBCH, the UE receives the PBCH information via radio resource control (RRC) signaling and an X2 or Xn interface that exchanges information between base stations. Receiving the information via an alternate source allows the UE to perform interference cancellation, even after failing to decode the PBCH.

In some aspects of the present disclosure, a neighbor PBCH decoding failure triggers measurement reporting for interference cancellation purposes. Thus, the UE requests the PBCH or interference cancellation information from the network in response to neighbor cell PBCH decoding failure. For example, if the UE recognizes strong interference from a neighbor cell but cannot decode the PBCH of that neighbor cell, the UE provides to the network a physical cell identifier (PCI) of that neighbor cell. In some aspects, the UE provides a list of PCIs associated with PBCH decoding failures to the network. The network may then obtain from the neighbor cell, via the X2 or Xn interface, the PBCH or interference cancellation information associated with the PCI(s) and forward that information to the UE. The neighbor cell may be an intra-frequency neighbor or an inter-RAT neighbor.

In other aspects of the present disclosure, the UE records a history of successful PBCH decoding results into a database. If subsequent PBCH decoding fails, the UE can refer to the information stored in the database to obtain the interference cancellation information in order to perform interference cancellation. For example, based on a location of the UE, the UE may locate prior decoding results from when the UE was previously at that location and able to successfully decode the PBCH. Some of the information in the PBCH may be time varying, but the variation in time may be in accordance to a pattern known to the UE. For example, the information related to system time in the PBCH may increment regularly on a modulo basis. The UE utilizes such patterns to infer the current information in the PBCH based on records of historically successful PBCH decoding.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B, an access point, a transmit and receive point (TRP), a network node, a network device, and/or the like. A base station can be implemented as an aggregated base station, as a disaggregated base station, an integrated access and backhaul (IAB) node, a relay node, a sidelink node, etc. The base station can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (Non-RT) RIC.

Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "AP," "node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types (e.g., macro BSs, pico BSs, femto BSs, relay BSs, and/or the like). These different types of BSs may have different transmit power levels, different coverage areas, and different impact on interference in the wireless network 100. For example, macro BSs may have a high transmit power level (e.g., 5 to 40 watts) whereas pico BSs, femto BSs, and relay BSs may have lower transmit power levels (e.g., 0.1 to 2 watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include an interference cancellation (IC) module 140. For brevity, only one UE 120d is shown as including the IC module 140. The IC module 140 may receive, from a serving cell, information to assist the UE with interference cancellation of at least one neighbor cell. The IC module 140 may also perform interference cancellation based on the information.

The core network 130 or the base stations 110 may include an IC module 138. For brevity, only one base station 110a is shown as including the IC module 138. The IC module 138 may obtain information to enable interference cancellation of a neighbor cell. The IC module 138 may also transmit the information to assist a user equipment (UE) with interference cancellation of the neighbor cell.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
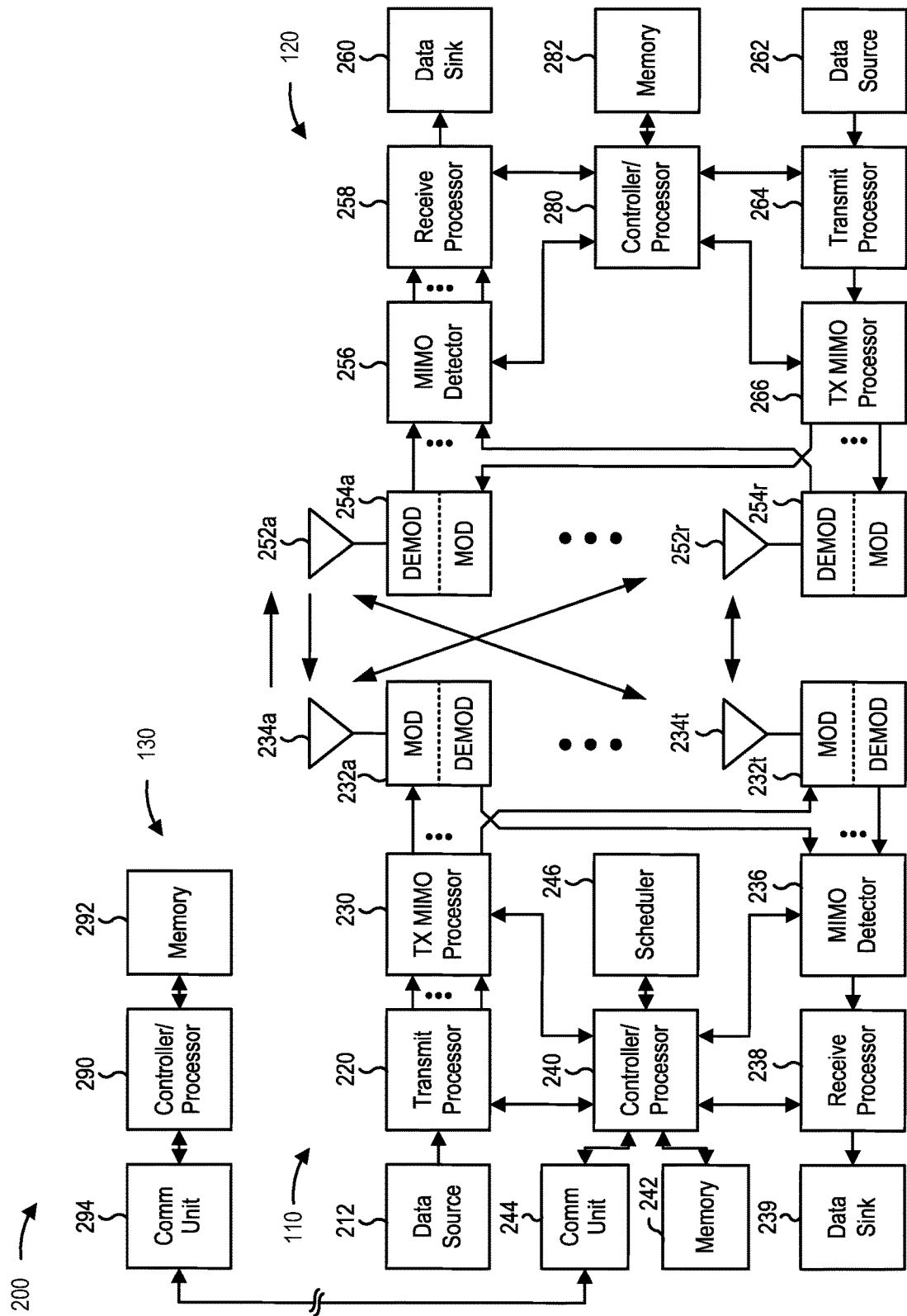
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-

OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with interference cancellation as described in more detail elsewhere. For example, the controller/processor 240 of the base station 110, the controller/processor 280 of the UE 120, and/or any other component(s) of FIG. 2 may perform or direct operations of, for example, the processes of FIGS. 4-6 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for receiving, means for performing, means for triggering, means for transmitting, and/or means for storing. In some aspects, the base station 110 may include means for obtaining, means for transmitting, means for receiving, and/or means for broadcasting. Such means may include one or more components of the UE 120 or base station 110 described in connection with FIG. 2.

As indicated above, FIG. 2 is provided merely as an example. Other examples may differ from what is described with regard to FIG. 2.

A 5G new radio (NR) standalone (SA) deployment may employ a low band frequency division duplex (FDD) spectrum in order to expand 5G coverage to achieve continuous NR coverage. This low band spectrum enables rapid coverage extension without requiring new sites. For example, some low band FDD spectrum (e.g., n1 (1920 MHz to 2170 MHz)) can support up to a 50 MHz bandwidth and thus may provide high capacity and coverage for a low capacity region.

For many network operators, this low band frequency spectrum is already reserved for long term evolution (LTE) communications. In existing wireless systems, such as LTE systems, a low band carrier (e.g., 1.8 GHz) may be deployed as a coverage layer in urban areas while a second carrier (e.g., 2.1 GHz) is deployed as a capacity layer in regions with high capacity requirements. Because the downlink/uplink load of cells in these existing systems remains high, migrating the low band spectrum in a hotspot region to an NR wireless system is challenging. Dynamic spectrum sharing (DSS) helps with migration of spectrum from LTE to NR. With DSS, NR and LTE may share the same spectrum. The shared spectrum is dynamically assigned based on traffic conditions in each technology.

In a DSS deployment, signals within existing LTE systems may interfere with NR communications. For example, a cell specific reference signal (CRS) is transmitted in LTE systems during every downlink subframe across the entire downlink cell bandwidth. The CRS is a high density, always-on signal in the time and frequency domains. Moreover, the CRS may be power boosted.

The CRS may therefore interfere with 5G communications. Other LTE signals may also interfere with 5G communications in a DSS deployment. For example, a system information block (SIB) message or another reference signal may interfere with 5G communications. In a 5G DSS deployment, the interference from intra-frequency neighbor LTE or DSS cells may reduce spectrum efficiency by up to 70% without any interference mitigation.

Figure 3:
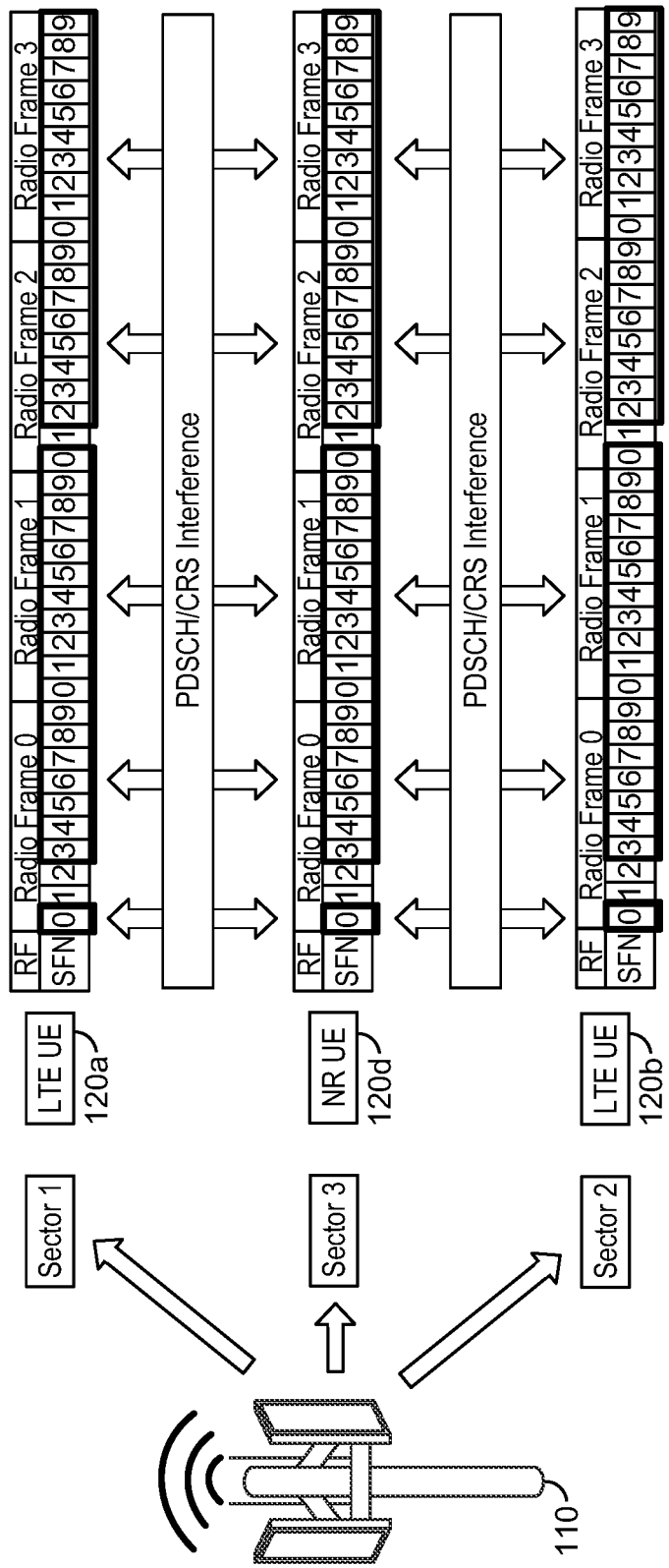
FIG. 3 is a block diagram illustrating interference between new radio (NR) and long term evolution (LTE) signaling.

FIG. 3 is a block diagram illustrating interference between new radio (NR) and long term evolution (LTE) signaling. In the example of FIG. 3, a base station 110 provides coverage to three sectors: sector 1 and sector 2, which are LTE cells, and sector 3, which is an NR cell. A first LTE UE 120*a* operates in sector 1, a second LTE UE 120*b* operates in sector 2, and an NR UE 120*d* operates in sector 3. In each of the sectors, multicast broadcast single frequency network (MBSFN) subframes are transmitted in radio frame (RF) 0, system frame number (SFN) 1 and 2, as well as radio frame 2, SFN 1. At all non-MBSFN subframes, communications from sectors 1 and 2 interfere with communications in sector 3. For example, interference is caused by cell specific reference signal (CRS) patterns transmitted in sectors 1 and 2, as well as physical downlink shared channels (PDSCH) transmitted in each sector. Although PDSCH interference may be difficult to remove, CRS interference may be mitigated to improve spectral efficiency.

Knowledge of one or more characteristics of the neighbor cell transmissions may improve interference cancellation performance. For example, knowledge of the neighbor cell CRS configuration may improve interference cancellation performance. This configuration information may be obtained by decoding a broadcast channel, such as a physical broadcast channel (PBCH), of the neighbor cell. If decoding of the neighbor cell PBCH is unsuccessful, neighbor cell reference signal interference cancellation, on non-multicast broadcast single frequency network (non-MBSFN) subframes, may be limited.

The PBCH carries information that helps with interference cancellation, such as a location of a reference signal or SIB. For example, the PBCH indicates a number of antenna ports for the CRS, a v shift value indicating a frequency shift for the CRS pattern (e.g., where the CRS is located in the frequency domain), SIB scheduling related information, bandwidth information, MBSFN information, a system frame number and other information for determining the time domain and frequency domain location of the CRS pattern, or another interfering signal. Without decoding the PBCH to learn this information, a UE may have difficulty performing the interference cancellation.

Cell specific reference signal interference cancellation (CRS-IC) may be activated when a difference between the reference signal received power (RSRP) of the neighbor and serving cells is less than some amount, for example, 9 dB. Successful CRS interference cancellation may achieve a serving signal to interference plus noise ratio (SINR) gain between 4-6 dB, in some scenarios. However, insufficient information for interference cancellation may prevent use of interference cancellation.

According to aspects of the present disclosure, a UE receives information to enable interference cancellation from sources other than from a decoded neighbor cell PBCH. For example, in response to a decoding failure of a neighbor LTE or DSS PBCH, the UE receives the PBCH information via radio resource control (RRC) signaling and an X2 or Xn interface. Receiving the information via an alternate source allows the UE to perform interference cancellation, even after failing to decode the PBCH. Although the present description is primarily with respect to PBCH information to enable interference cancellation of a CRS, the present disclosure is not so limited. Other types of information may enable interference cancellation, such as SIB scheduling information or reference signal configuration information for reference signals other than CRS.

In some aspects of the present disclosure, a neighbor PBCH decoding failure triggers measurement reporting for interference cancellation purposes. Thus, the UE requests the PBCH or interference cancellation information from the network in response to neighbor cell PBCH decoding failure. For example, if the UE recognizes strong interference from a neighbor cell but cannot decode the PBCH of that neighbor cell, the UE provides to the network a physical cell identifier (PCI) of that neighbor cell. The UE may obtain the PCI by decoding the primary synchronization signal (PSS) and secondary synchronization signal (SSS) of the neighbor cell. In some aspects, the UE provides a list of PCIs associated with PBCH decoding failures to the network. The network may then obtain from the neighbor cell the PBCH or interference cancellation information associated with the PCI(s) and forward that information to the UE. The neighbor cell may be an intra-frequency neighbor or an inter-RAT neighbor.

In other aspects of the present disclosure, the UE records a history of successful PBCH decoding results into a database. If subsequent PBCH decoding fails, the UE can refer to the information stored in the database to obtain the interference cancellation information in order to perform interference cancellation. For example, based on a location of the UE, the UE may be able to locate prior decoding results from when the UE was previously at that location and able to successfully decode the PBCH.

In some aspects of the present disclosure, the serving cell obtains the PBCH or interference cancellation assistance information of the neighbor cell through an X2 or Xn interface, which couples the serving and neighbor base stations. In other aspects, the serving cell may obtain the interference cancellation information from the core network, which may receive the information from the neighbor cell. In either case, the information exchange is needed only when the UE requests cancellation assistance information to reduce the burden of traffic between network nodes. Such exchange could also happen periodically for a certain duration after the UE requests interference cancellation assistance information. After the serving cell receives the neighbor PBCH information, the serving cell informs the UE of the PBCH information via an RRC reconfiguration message. Thus, the UE can use the PBCH information carried in the RRC reconfiguration message to perform interference cancellation in case of a neighbor LTE or DSS PBCH decoding failure.

In some aspects of the present disclosure, a neighbor cell may notify the serving cell if its PBCH information is changed beyond those regular patterns. Such changes, although happening infrequently, result in UE failure in decoding the new PBCH without an update. Hence, when such a change happens, the neighbor cell notifies the serving cell, which in turn notifies the UE. The notification from the neighbor cell to the serving cell may be transmitted from the neighbor cell to the serving cell directly, or via the core network.

Figure 4:
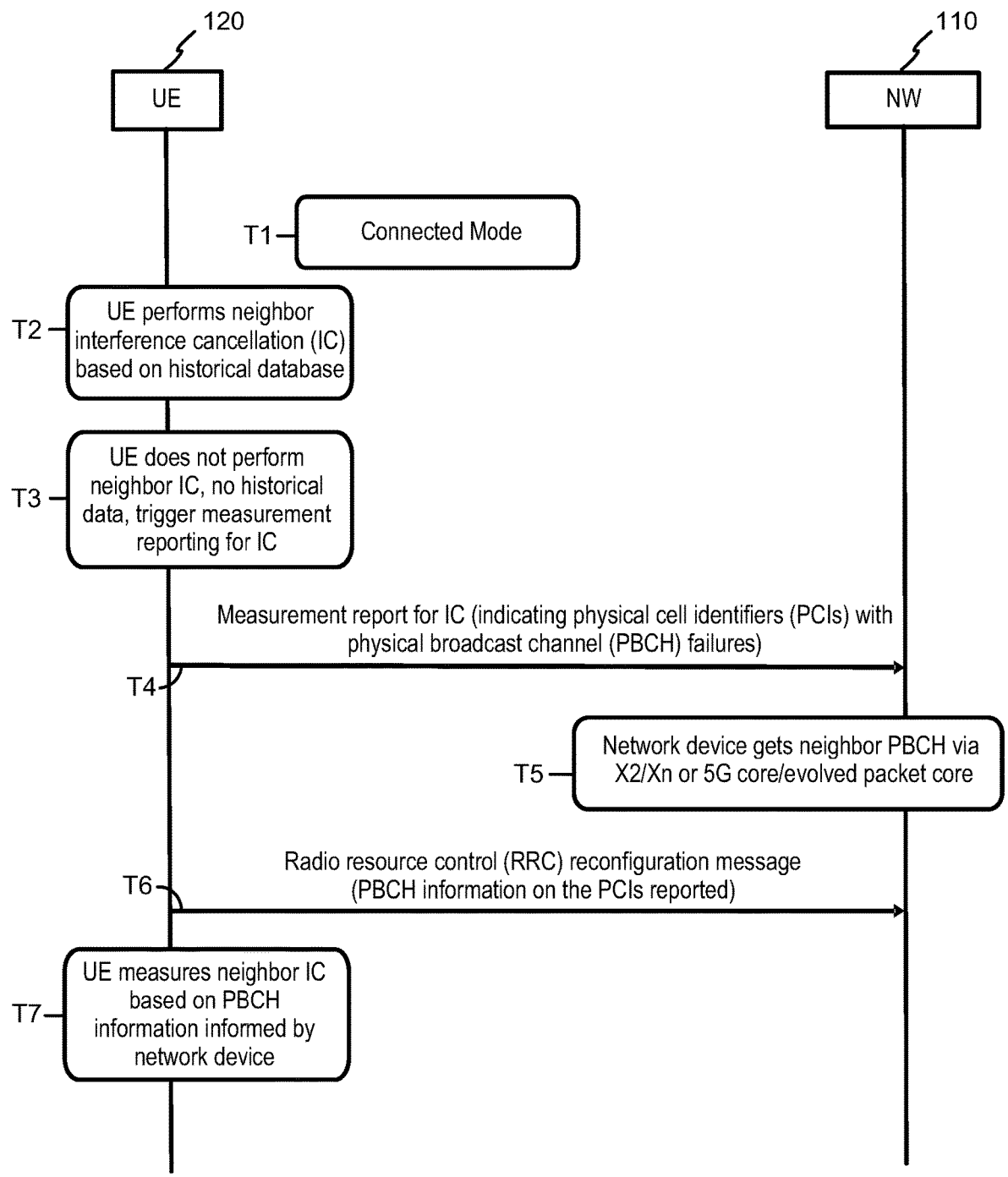
FIG. 4 is a timing diagram illustrating improved interference cancellation, in accordance with aspects of the present disclosure.

FIG. 4 is a timing diagram illustrating improved interference cancellation, in accordance with aspects of the present disclosure. In the example of FIG. 4, a UE 120 communicates with a network device, such as a base station 110. The UE 120 may be operating in a DSS network deployment. At time t1, the UE 120 is in connected mode with the network device 110 but is experiencing significant interference from a neighbor cell. The UE 120, however, fails to decode the neighbor PBCH, possibly preventing the UE 120 from applying interference cancellation techniques on an interfering signal.

According to some aspects of the present disclosure, at time t2, the UE performs neighbor cell interference cancellation based on a historical database. The database stores previous successful decoding results for the neighbor PBCH. In case the historical database is not available to enable neighbor cell interference cancellation, at time t3, the neighbor PBCH decoding failure triggers measurement reporting for interference cancellation. Thus, at time t4, the UE 120 transmits a measurement report to the network device 110. The measurement report includes a list of PCIs with PBCH decoding failures. At time t5, the network device 110 obtains the neighbor PBCH(s). The network device 110 may obtain the PBCH information via X2 or Xn communications with the neighbor base station or via 5G core (5GC)/evolved packet core (EPC) communications with the core network.

After retrieving the information to enable interference cancellation, at time t6, the network device 110 transmits an RRC reconfiguration message to the UE 120. The RRC reconfiguration message includes the PBCH information for the PCIs reported with PBCH decoding failures. At time t7, the UE 120 performs neighbor interference cancellation based on the PBCH information received from the network device 110.

In some aspects of the present disclosure, UE capability signaling may indicate interference cancellation capabilities of a UE. For example, the UE capability signaling may indicate whether the UE has interference cancellation capabilities, and if so, for how many neighbor cells the UE can perform interference cancellation. The UE capability signaling may further indicate a signal strength difference between a serving cell and a neighbor cell for which the UE can perform interference cancellation. For example, the UE may only be able to perform interference cancellation if the signal strength difference between the serving and neighbor cells is below some value. The UE capability signaling may also indicate whether the UE supports interference cancellation for reference signals, or whether the UE supports interference cancellation for a system information block (SIB).

In other aspects, the network may send interference cancellation assistance information to the UE even in the absence of UE reporting, as shown in FIG. 4 at time t4. As an example, the UE reporting may indicate cells associated with a neighbor PBCH decoding failure. In these aspects, for example, based on UE location information, the network may determine which neighbor PBCHs will likely not be successfully decoded. The network may then send the UE the PBCH information for those cells that transmit PBCHs that likely will not be successfully decoded. The UE capability signaling may indicate how many cells can be cancelled by the UE. Thus, the network may send interference cancellation information for the indicated number of cells.

In some aspects of the present disclosure, the interference cancellation information is broadcast from the network. The broadcast may occur through an on-demand SIB that is broadcast to all users in the cell. In these aspects, the on-demand SIB is triggered by any UE reporting a PBCH decoding failure. Thus, the on-demand SIB saves overhead by broadcasting to all users only when some users experience interference from other PBCHs.

The techniques of the present disclosure allow UEs to effectively perform neighbor cell interference cancellation, even when neighbor PBCH decoding fails. The interference cancellation may address issues in dynamic spectrum sharing deployments faced by network operators. The interference cancellation may help with cancelling an interfering reference signal, such as a CRS, or with cancelling an interfering SIB message.

As indicated above, FIGS. 3-4 are provided as examples. Other examples may differ from what is described with respect to FIGS. 3-4.

Figure 5:
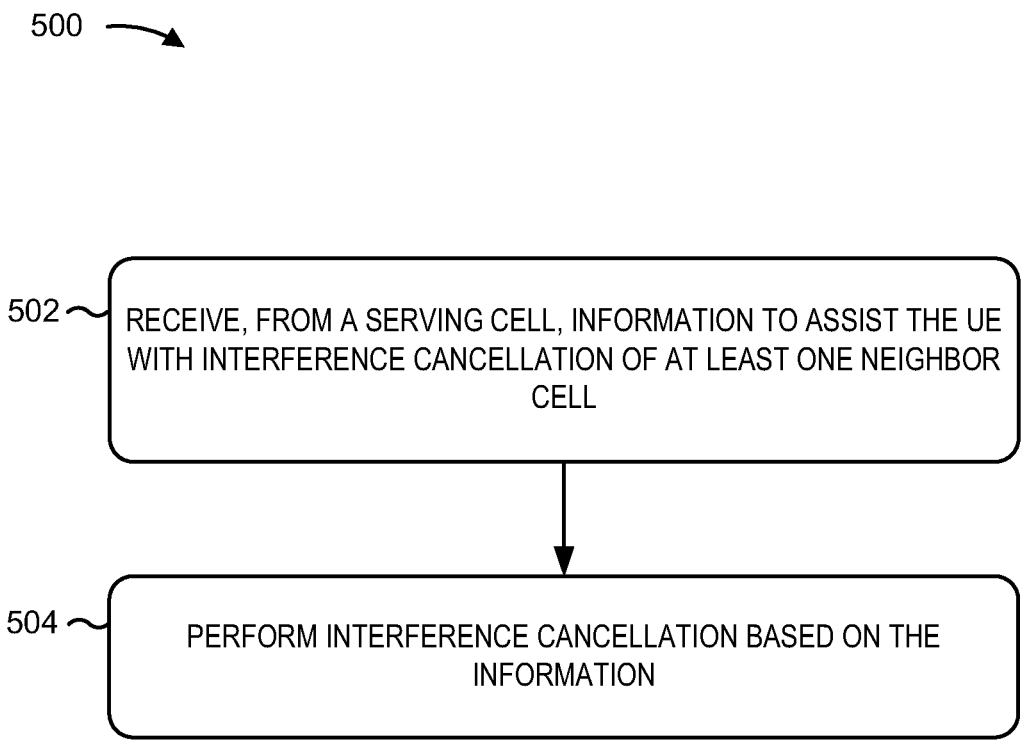
FIG. 5 is a flow diagram illustrating an example process performed, for example, by a user equipment (UE), in accordance with various aspects of the present disclosure.

FIG. 5 is a flow diagram illustrating an example process 500 performed, for example, by a user equipment (UE), in accordance with various aspects of the present disclosure. The example process 500 is an example of improved interference cancellation, for example, in a dynamic spectrum sharing (DSS) deployment. The operations of the process 500 may be implemented by a UE 120.

At block 502, the user equipment (UE) receives, from a serving cell, information to assist the UE with interference cancellation of at least one neighbor cell. For example, the UE (e.g. using the antenna 252, DEMOD/MOD 254, MIMO detector 256, receive processor 258, controller/processor 280, and/or memory 282) may receive the information. The information may be physical broadcast channel (PBCH) information, system information block (SIB) scheduling information, and/or reference signal configuration information associated with the at least one neighbor cell. The information may be received via a SIB and/or RRC signaling, in some aspects.

At block 504, the user equipment (UE) performs interference cancellation based on the information. For example, the UE (e.g. using the controller/processor 280 and/or memory 282) may perform the interference cancellation of an aggressor cell based on the SIB, PBCH, and/or reference signal configuration information.

Figure 6:
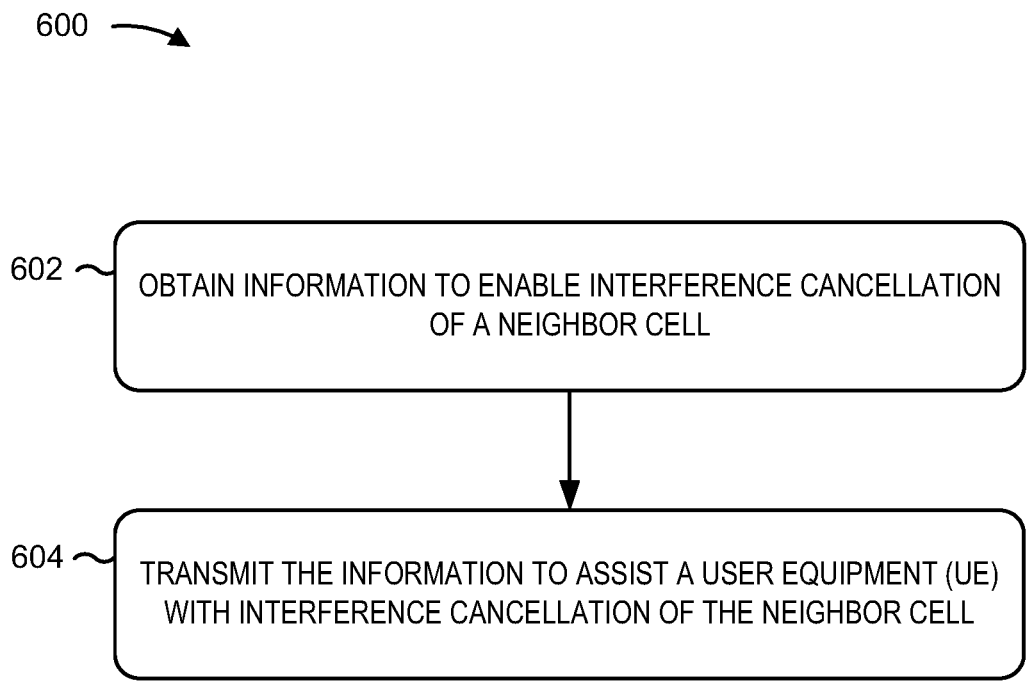
FIG. 6 is a flow diagram illustrating an example process performed, for example, by a network device, in accordance with various aspects of the present disclosure.

FIG. 6 is a flow diagram illustrating an example process 600 performed, for example, by a network device, in accordance with various aspects of the present disclosure. The example process 600 is an example of improved interference cancellation, for example, in a dynamic spectrum sharing (DSS) deployment. The operations of the process 600 may be implemented by a network device, such as a base station 130.

At block 602, the network device obtains information to enable interference cancellation of a neighbor cell. For example, the network device station (e.g. using the antenna 234, MOD/DEMOD 232, MIMO detector 236, receive processor 238, controller/processor 240, and/or memory 242) may obtain the information. The information may be physical broadcast channel (PBCH) information, system information block (SIB) scheduling information, and/or reference signal configuration information associated with the at least one neighbor cell.

At block 604, the network device transmits the information to assist a user equipment (UE) with interference cancellation of the neighbor cell. For example, the network device (e.g. using the antenna 234, MOD/DEMOD 232, TX MIMO processor 230, transmit processor 220, controller/processor 240, and/or memory 242) may transmit the information. In some aspects, the information may be transmitted via RRC signaling. In other aspects, the information is broadcast in a SIB in response to receiving a request for the SIB.

Example Aspects

Aspect 1: A method of wireless communication by a user equipment (UE), comprising: receiving, from a serving cell, information to assist the UE with interference cancellation of at least one neighbor cell; and performing interference cancellation based on the information.

Aspect 2: The method of Aspect 1, in which the information comprises at least one of physical broadcast channel (PBCH) information, system information block (SIB) scheduling information, or reference signal configuration information associated with the at least one neighbor cell.

Aspect 3: The method of Aspect 1 or 2, further comprising triggering a measurement report in response to failing to decode a physical broadcast channel (PBCH) of the at least one neighbor cell, the measurement report requesting the serving cell to transmit the information associated with the at least one neighbor cell.

Aspect 4: The method of any of the preceding Aspects, further comprising receiving the information via a system information block (SIB) message.

Aspect 5: The method of any of the preceding Aspects, further comprising receiving the information via radio resource control (RRC) signaling.

Aspect 6: The method of any of the preceding Aspects, further comprising transmitting a UE capability indicating whether the UE supports interference cancellation.

Aspect 7: The method of any of the preceding Aspects, in which the UE capability indicates at least one of: a number of cells supported for interference cancellation by the UE, a signal strength difference between the serving cell and the at least one neighbor cell for which the UE can perform interference cancellation, whether the UE supports interference cancellation for reference signals, or whether the UE supports interference cancellation for a system information block (SIB).

Aspect 8: The method of any of the preceding Aspects, further comprising storing in a database, a history of results for decoding a physical broadcast channel (PBCH) of the at least one neighbor cell, the history assisting with the interference cancellation.

Aspect 9: A method of wireless communication by a network device, comprising: obtaining information to enable interference cancellation of a neighbor cell; and transmitting the information to assist a user equipment (UE) with interference cancellation of the neighbor cell.

Aspect 10: The method of Aspect 9, in which the network device comprises a serving base station.

Aspect 11: The method of Aspect 9 or 10, in which the information comprises at least one of physical broadcast channel (PBCH) information, system information block (SIB) scheduling information, or reference signal configuration information associated with the neighbor cell.

Aspect 12: The method of any of the Aspects 9-11, further comprising: receiving a measurement report identifying the neighbor cell; obtaining the information in response to receiving the measurement report; and transmitting the information after obtaining the information.

Aspect 13: The method of any of the Aspects 9-12, further comprising: receiving a UE capability message indicating support for interference cancellation; and transmitting the information in response to receiving the UE capability message.

Aspect 14: The method of any of the Aspects 9-13, in which the UE capability message indicates at least one of: a number of cells supported for interference cancellation by the UE, a signal strength difference between a serving cell and the neighbor cell for which the UE can perform interference cancellation, whether the UE supports interference cancellation for reference signals, or whether the UE supports interference cancellation for a system information block (SIB).

Aspect 15: The method of any of the Aspects 9-14, further comprising transmitting the information via radio resource control (RRC) signaling.

Aspect 16: The method of any of the Aspects 9-14, further comprising: receiving a request for a system information block (SIB); and broadcasting the information in the SIB, in response to receiving the request.

Aspect 17: An apparatus for wireless communication by a user equipment (UE), comprising: a memory; and at least one processor coupled to the memory, the at least one processor configured: to receive, from a serving cell, information to assist the UE with interference cancellation of at least one neighbor cell; and to perform interference cancellation based on the information.

Aspect 18: The apparatus of Aspect 17, in which the information comprises at least one of physical broadcast channel (PBCH) information, system information block (SIB) scheduling information, or reference signal configuration information associated with the at least one neighbor cell.

Aspect 19: The apparatus of Aspect 17 or 18, in which the at least one processor is further configured to trigger a measurement report in response to failing to decode a physical broadcast channel (PBCH) of the at least one neighbor cell, the measurement report requesting the serving cell to transmit the information associated with the at least one neighbor cell.

Aspect 20: The apparatus of any of the Aspects 17-19, in which the at least one processor is further configured to receive the information via a system information block (SIB) message.

Aspect 21: The apparatus of any of the Aspects 17-20, in which the at least one processor is further configured to receive the information via radio resource control (RRC) signaling.

Aspect 22: The apparatus of any of the Aspects 17-21, in which the at least one processor is further configured to transmit a UE capability indicating whether the UE supports interference cancellation.

Aspect 23: The apparatus of any of the Aspects 17-22, in which the UE capability indicates at least one of: a number of cells supported for interference cancellation by the UE, a signal strength difference between the serving cell and the at least one neighbor cell for which the UE can perform interference cancellation, whether the UE supports interference cancellation for reference signals, or whether the UE supports interference cancellation for a system information block (SIB).

Aspect 24: The apparatus of any of the Aspects 17-23, in which the at least one processor is further configured to store in a database, a history of results for decoding a physical broadcast channel (PBCH) of the at least one neighbor cell, the history assisting with the interference cancellation.

Aspect 25: An apparatus for wireless communication by a network device, comprising: a memory; and at least one processor coupled to the memory, the at least one processor configured: to obtain information to enable interference cancellation of a neighbor cell; and to transmit the information to assist a user equipment (UE) with interference cancellation of the neighbor cell.

Aspect 26: The apparatus of Aspect 25, in which the network device comprises a serving base station.

Aspect 27: The apparatus of Aspect 25 or 26, in which the information comprises at least one of physical broadcast channel (PBCH) information, system information block (SIB) scheduling information, or reference signal configuration information associated with the neighbor cell.

Aspect 28: The apparatus of any of the Aspects 25-27, in which the at least one processor is further configured: to receive a measurement report identifying the neighbor cell; to obtain the information in response to receiving the measurement report; and to transmit the information after obtaining the information.

Aspect 29: The apparatus of any of the Aspects 25-28, in which the at least one processor is further configured: to receive a UE capability message indicating support for interference cancellation; and to transmit the information in response to receiving the UE capability message.

Aspect 30: The apparatus of any of the Aspects 25-29, in which the UE capability message indicates at least one of: a number of cells supported for interference cancellation by the UE, a signal strength difference between a serving cell and the neighbor cell for which the UE can perform interference cancellation, whether the UE supports interference cancellation for reference signals, or whether the UE supports interference cancellation for a system information block (SIB).

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE), comprising:
receiving, from a serving cell, information to assist the UE with interference cancellation of at least one neighbor cell;
storing in a database, a history of results for decoding a physical broadcast channel (PBCH) of the at least one neighbor cell, the history assisting with the interference cancellation; and
performing the interference cancellation based on the information.

2. The method of claim 1, in which the information comprises at least one of physical broadcast channel (PBCH) information, system information block (SIB) scheduling information, or reference signal configuration information associated with the at least one neighbor cell.

3. The method of claim 1, further comprising triggering a measurement report in response to failing to decode the physical broadcast channel (PBCH) of the at least one neighbor cell, the measurement report requesting the serving cell to transmit the information associated with the at least one neighbor cell.

4. The method of claim 1, further comprising receiving the information via a system information block (SIB) message.

5. The method of claim 1, further comprising receiving the information via radio resource control (RRC) signaling.

6. The method of claim 1, further comprising transmitting a UE capability indicating whether the UE supports the interference cancellation.

7. The method of claim 6, in which the UE capability indicates at least one of: a number of cells supported for the interference cancellation by the UE, a signal strength difference between the serving cell and the at least one neighbor cell for which the UE can perform the interference cancellation, whether the UE supports the interference cancellation for reference signals, or whether the UE supports the interference cancellation for a system information block (SIB).

8. The method of claim 1, in which the serving cell operates in a first radio access technology (RAT) and the at least one neighbor cell operates in a second RAT, the first RAT and the second RAT dynamically sharing a same spectrum.

9. An apparatus for wireless communication by a user equipment (UE), comprising:
at least one memory; and
at least one processor coupled to the at least one memory, the at least one processor configured:
to receive, from a serving cell, information to assist the UE with interference cancellation of at least one neighbor cell;
to store in a database, a history of results for decoding a physical broadcast channel (PBCH) of the at least one neighbor cell, the history assisting with the interference cancellation; and
to perform the interference cancellation based on the information.

10. The apparatus of claim 9, in which the information comprises at least one of physical broadcast channel (PBCH) information, system information block (SIB) scheduling information, or reference signal configuration information associated with the at least one neighbor cell.

11. The apparatus of claim 9, in which the at least one processor is further configured to trigger a measurement report in response to failing to decode the physical broadcast channel (PBCH) of the at least one neighbor cell, measurement report requesting the serving cell to transmit the information associated with the at least one neighbor cell.

12. The apparatus of claim 9, in which the at least one processor is further configured to receive the information via a system information block (SIB) message.

13. The apparatus of claim 9, in which the at least one processor is further configured to receive the information via radio resource control (RRC) signaling.

14. The apparatus of claim 9, in which the at least one processor is further configured to transmit a UE capability indicating whether the UE supports the interference cancellation.

15. The apparatus of claim 14, in which the UE capability indicates at least one of: a number of cells supported for the interference cancellation by the UE, a signal strength difference between the serving cell and the at least one neighbor cell for which the UE can perform the interference cancellation, whether the UE supports the interference cancellation for reference signals, or whether the UE supports the interference cancellation for a system information block (SIB).

16. The apparatus of claim 9, in which the serving cell operates in a first radio access technology (RAT) and the at least one neighbor cell operates in a second RAT, the first RAT and the second RAT dynamically sharing a same spectrum.

* * * * *